July 26, 1966  G. E. WARNAKA  3,262,521
STRUCTURAL DAMPING
Filed Aug. 21, 1964  5 Sheets-Sheet 1

INVENTOR.
GLENN E. WARNAKA
BY
Brown, Critchlow, Flick & Peckham
ATTORNEYS

July 26, 1966

G. E. WARNAKA 3,262,521

STRUCTURAL DAMPING

Filed Aug. 21, 1964

INVENTOR.
GLENN E. WARNAKA
BY
Brown, Critchlow, Flick & Peckham
ATTORNEYS.

July 26, 1966 G. E. WARNAKA 3,262,521
STRUCTURAL DAMPING
Filed Aug. 21, 1964 5 Sheets-Sheet 3

INVENTOR.
GLENN E. WARNAKA
BY
Brown, Critchlow, Flick & Peckham
ATTORNEYS.

July 26, 1966

G. E. WARNAKA 3,262,521

STRUCTURAL DAMPING

Filed Aug. 21, 1964

INVENTOR.
GLENN E. WARNAKA
BY
Brown, Critchlow, Flick & Peckham.
ATTORNEYS.

July 26, 1966  G. E. WARNAKA  3,262,521
STRUCTURAL DAMPING

Filed Aug. 21, 1964  5 Sheets-Sheet 5

INVENTOR.
GLENN E. WARNAKA
BY
Brown, Critchlow, Flick & Peckham
ATTORNEYS.

United States Patent Office 3,262,521
Patented July 26, 1966

3,262,521
STRUCTURAL DAMPING
Glenn E. Warnaka, Erie, Pa., assignor to Lord Corporation, a corporation of Pennsylvania
Filed Aug. 21, 1964, Ser. No. 391,263
25 Claims. (Cl. 188—1)

This invention relates to, and has among its principal objects the provision of, means for damping flexural vibrations in the surface of a structural member, including vibrations that are characterized, in whole or in part, by a general directional orientation of bending or flexing.

A further object is to obtain such damping as above described by using well-known energy-dissipative, viscoelastic materials in such a way as to increase substantially the damping effectiveness of a given thickness or quantity of such material.

Still further objects of the invention will be apparent from the following description of the invention, in connection with the attached drawings, in which FIG. 1 is a fragmentary plan view of a structural base member, in which a layer of viscoelastic damping material is supported in spaced relation to the base member by numerous plates which are rigidly mounted on the base member in orthogonal rows and are oriented in a single direction;

Figure 4:
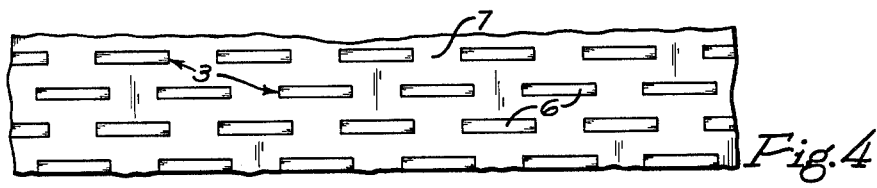
FIG. 4 is a fragmentary plan view of a modified form of the invention shown in FIG. 1, with the plates in one row overlapping those in an adjacent row.
Figure 5:
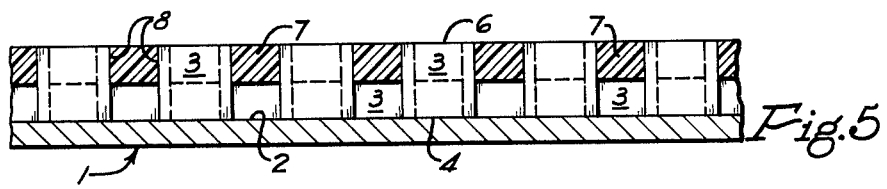
FIG. 5 is an elevation of the structure shown in FIG. 4.
Figure 6:
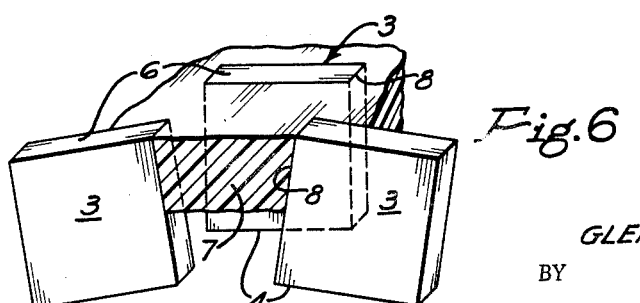
Figure 7:
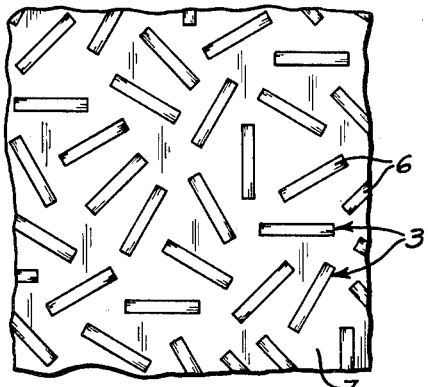
Figure 8:
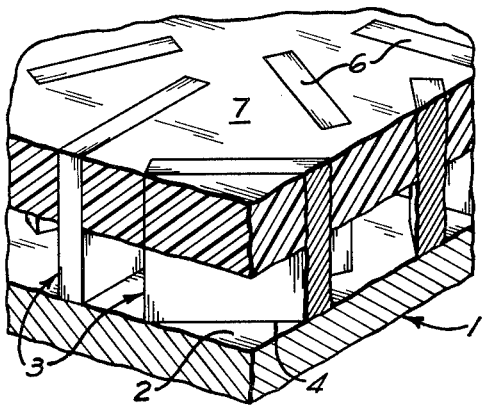
Figure 9:
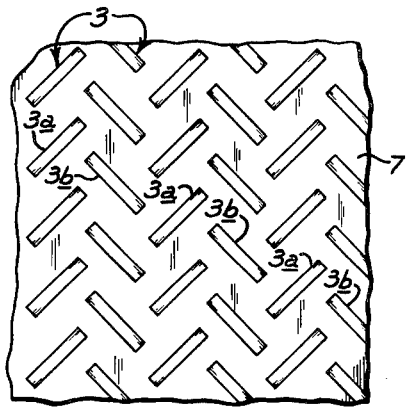
Figure 10:
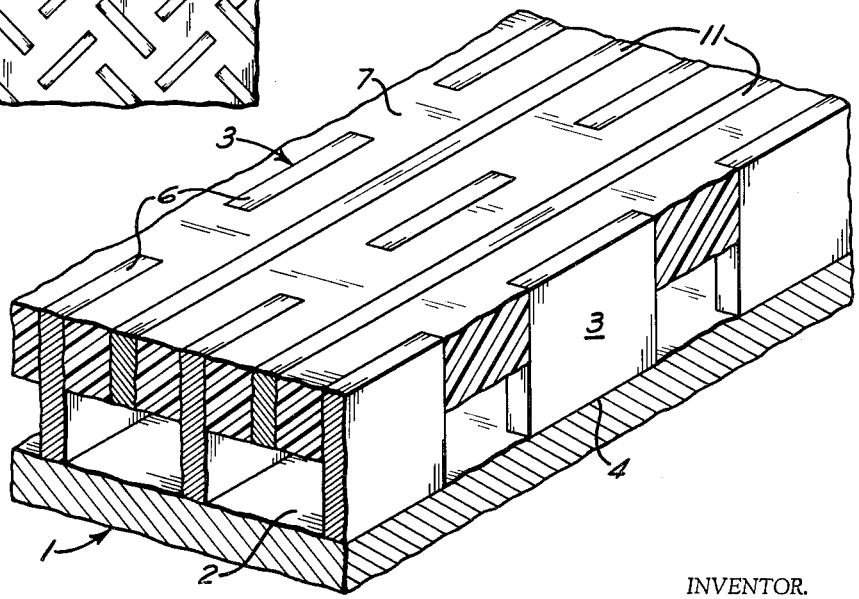
Figure 11:
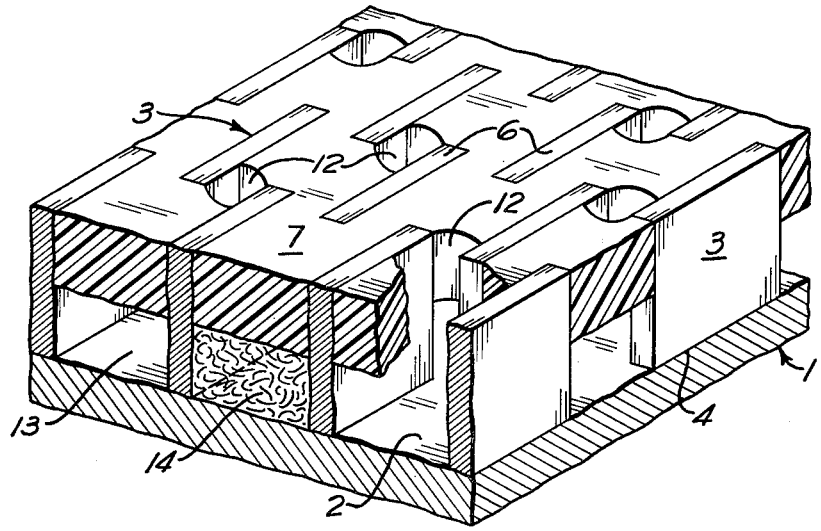
Figure 12:
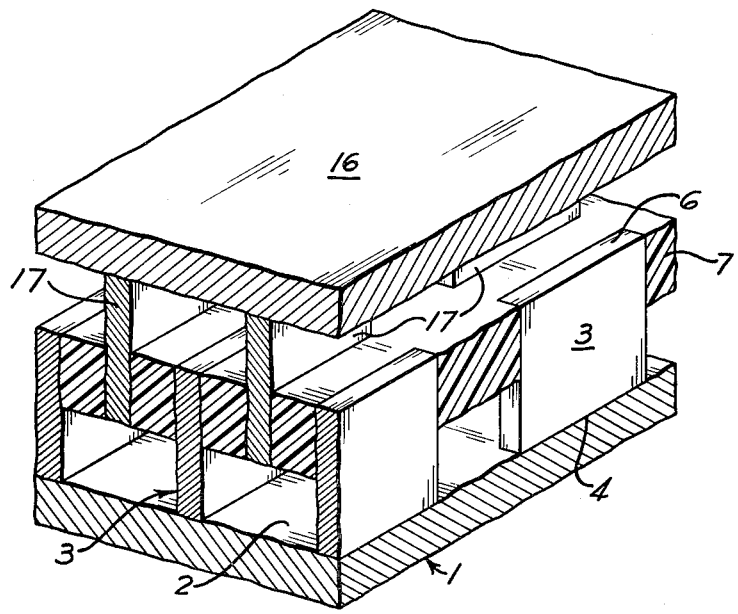
Figure 13:
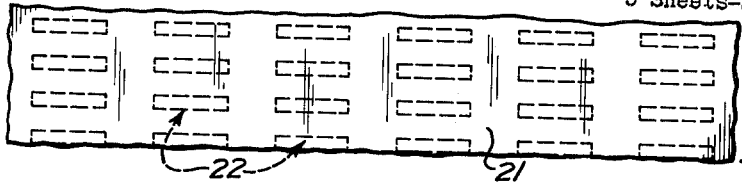
Figure 14:
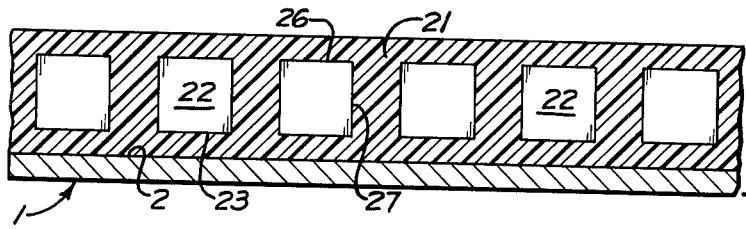
Figure 15:
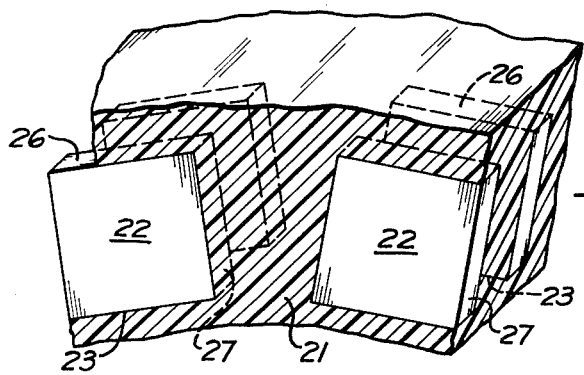
Figure 16:
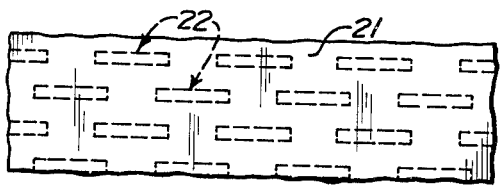
Figure 17:
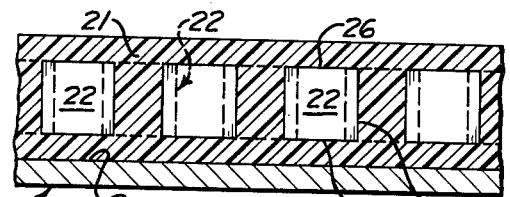
Figure 18:
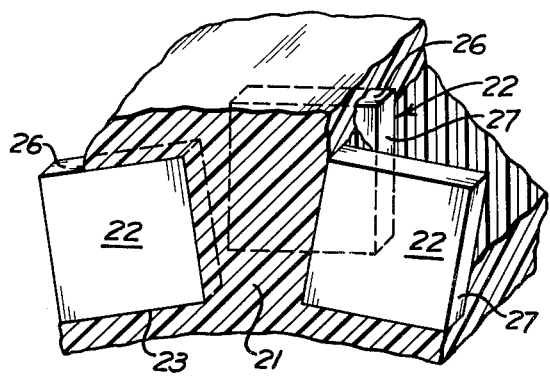

FIG. 6 is an enlarged, fragmentary, isometric view of a portion of the structure of FIGS. 4 and 5, showing the relative longitudinal and rotational displacement of the plates and the resulting deformation of the damping material when the structural member is flexed transversely of the general direction of orientation of the plates, such displacement and the resulting deformation being exaggerated for clarity;

FIG. 7 is a fragmentary plan view of another modified form of the invention, in which the plates supporting the viscoelastic material are randomly oriented;

FIG. 8 is an enlarged, fragmentary, isometric view of a portion of FIG. 7;

FIG. 9 is a fragmentary plan view of a still further modification, in which the plates supporting the viscoelastic material are oriented in two different directions;

FIG. 10 is a fragmentary, isometric view of yet another modification, in which continuous stiff members are suspended in the viscoelastic material between adjacent rows of plates;

FIG. 11 is a fragmentary, isometric view, partly in section, of a further modification of the structure of FIG. 4, providing additionally for acoustical damping;

FIG. 12 is a fragmentary, isometric view, partly in section of a further modified form of the invention, providing an extended constraining layer opposite to the surface to be damped;

FIG. 13 is a fragmentary plan view of still another modification of the invention;

FIG. 14 is an enlarged, fragmentary, sectional elevation of FIG. 13, showing the plates arranged in orthogonal rows and supported in spaced relation to the surface of the base member by a layer of viscoelastic damping material that is attached to said surface;

FIG. 15 is a still further enlarged, fragmentary, isometric view, partly in section, of FIGS. 13 and 14, showing the relative longitudinal and rotational displacement of the plates and the resulting deformation of the damping material when the structural member is flexed transversely of the general direction of orientation of the plates, such displacement and deformation being exaggerated for clarity;

FIG. 16 is a fragmentary plan view of a further modification of the general form of the invention that is shown in FIGS. 13–15, with the plates arranged in overlapping rows;

FIG. 17 is an enlarged, fragmentary, sectional elevation of FIG. 16;

FIG. 18 is an enlarged, fragmentary, isometric view, partly in section, of FIGS. 16 and 17, showing the relative longitudinal and rotational displacement of the plates and the resulting deformation of the damping material when the structural member is flexed transversely of the general direction of orientation of the plates, such displacement and deformation being exaggerated for clarity.

Figure 19:
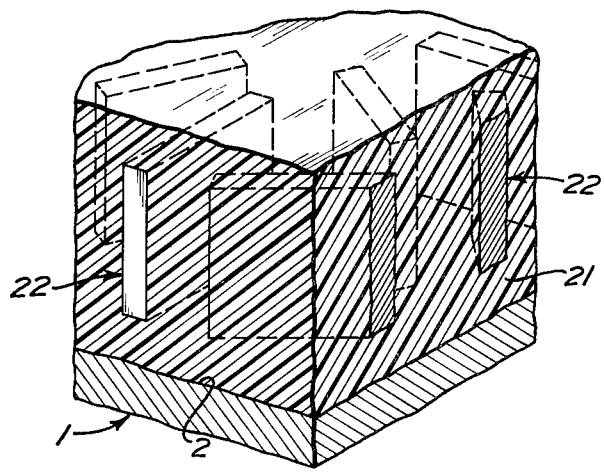
Figure 20:
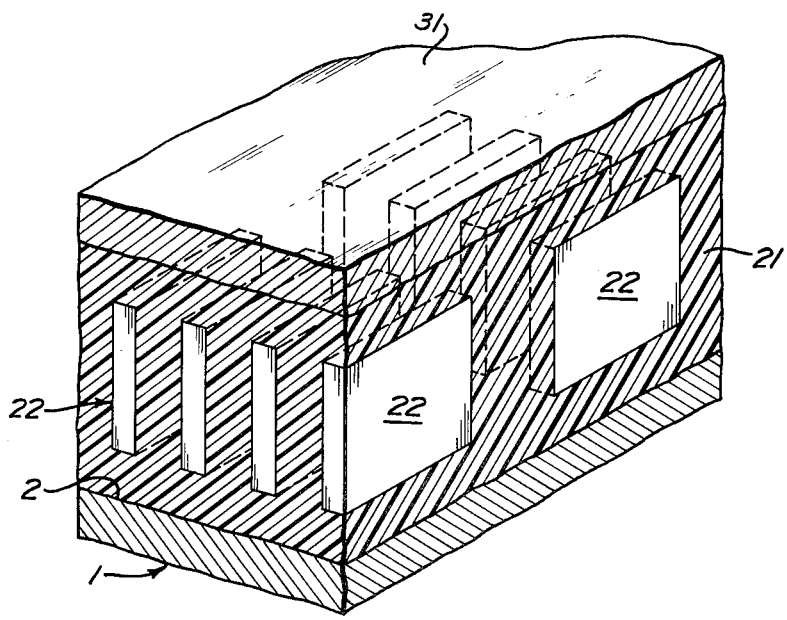

FIG. 19 is a fragmentary, isometric view, partly in section, of another modified form of the invention shown in FIGS. 13–15, with the plates arranged with their lower edges randomly oriented;

FIG. 20 is a fragmentary, isometric view, partly in section, of a further form of the invention similar to that shown in FIGS. 13–15, and including an extended constraining layer opposite to the surface to be damped.

In accordance with this invention, the damping of a base member having an extended surface subject to flexural vibrations is provided by a combination of plate means and viscoelastic damping means applied to that surface. Only one of those means, however, contacts the surface of the base member, and it is secured directly thereto for supporting the other of those means in spaced relation to the surface of the base member. In this combination, the plate means are arranged with their faces and edges in spaced realtion to each other and with their faces oriented substantially normal to the surface to be damped; and the damping means embeds the faces and edges of at least the end portions of the plate means remote from the surface of the base member and acts as a bonding matrix in holding them apart. The viscoelastic damping means is selected to have a modulus of elasticity that is substantially less than that of the plate means and of the base member. When the base member is subjected to flexural vibrations, the viscoelastic damping means between the plate means will be subjected to a high order of deformatiton that will effectively damp the vibrations. Depending upon the configuration, arrangement, and orientation of the plate means, such deformation may be either predominantly extension and compression within limited zones, or predominantly shearing within other limited zones, or combinations of both types of deformation; and, depending on the orientation of the plate means, the damping effect can be made more or less responsive to flexural vibrations that are characterized by a directional orientation of bending or flexing.

In the embodiment of the invention illustrated in FIGS. 1–12, a quantity of relatively stiff plates are rigidly secured along an edge portion of each plate to the surface of a base member that is subject to flexural vibrations. These plates extend substantially normal to the surface to be damped and are arranged in spaced relation to each other in random or ordered arrays. The free ends of the plates remote from said surface are embedded in and serve as support members for a layer of viscoelastic damping material, which is also spaced from said surface and acts as a bonding matrix between the separated free ends of the plates.

In FIGS. 1–12, the structural base member to be damped is represented by a stiff metal sheet 1, having a surface 2. A quantity of stiff metal support members 3, in the form of thin plates that are relatively small compared to the length and area of the surface 2, are rigidly secured by any suitable means along an edge portion 4 of each plate to the surface 2, so as to extend substantially perpendicular to that surface. The plates are preferably either square or rectangular; but they may also be of other desired geometric shapes, such as, for example, triangular, trapezoidal, L-shaped, T-shaped, etc. The free ends 6 of the plates remote from the surface 2 are embedded in a layer 7 of viscoelastic material that is characterized by a stiffness, or Young's modulus of elasticity, substantially less than that of the base 1 and of the plates 3 and that is also characterized by high mechanical hysteresis or internal friction. Various well-known damping materials of this type may be used, such as asphalts, waxes, soft rubber, rubber-like polymers, and many other elastic or plastic materials having the desired energy absorbing properties. This layer of viscoelastic material is spaced from surface 2 and is of sufficient thickness to embed a substantial portion of the free ends of the plates, such spacing and thickness varying, of course, with the type of vibration to be damped, the characteristics of the plates and their orientation, and the kind of damping material used. The layer 7 serves as a matrix in which the free end of each plate is both separated from and bonded to adjacent members.

Figure 1:
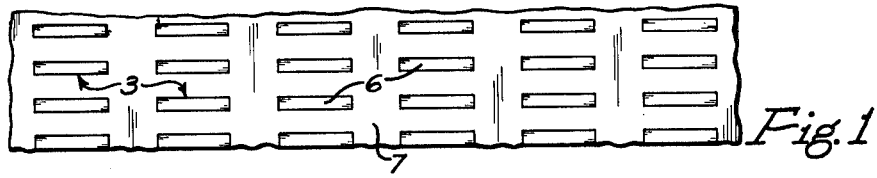
Figure 2:
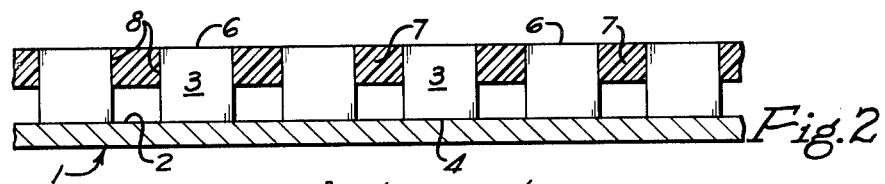
FIG. 2 is an elevation of the structure shown in FIG. 1.
Figure 3:
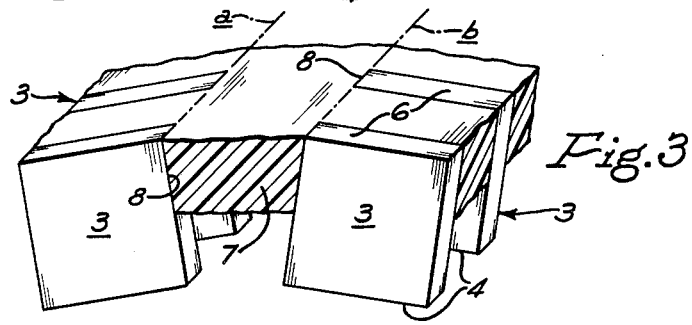
FIG. 3 is an enlarged, fragmentary, isometric view of a portion of FIGS. 1 and 2, showing the relative longitudinal and rotational displacement of the plates and the resulting deformation of the damping material when the structural member is flexed transversely of the general direction of orientation of the plates such displacement and deformation being exaggerated for clarity.

Referring specifically to FIGS. 1–3, the plates 3 are preferably oriented with their edges 4 extending generally transverse to the wave front of the vibrations that are primarily to be damped, which are here assumed to be transverse waves. These plates are also shown as arranged in orthogonal rows, that is, the plates are aligned both in rank (transversely of surface 2) and in file (longitudinally of surface 2); and, since the plates are all the same size, there is no overlapping of plates in adjacent rows. When this structure is bent or flexed transversely of its length, that is, about an axis perpendicular to the plane of the drawing, the side edges 8 of adjacent plates in each row of plates will move closer together or farther apart, depending upon the direction of bending. Under vibrating conditions, the edges will move together and then apart in each vibration cycle, the plates in the same rank moving in unison. As a result, the viscoelastic material between the vertical edges 8 of the plates (for example, the material between the lines $a$ and $b$ in FIG. 3) will be subjected alternately to extension and compression. It will be noted that such deformation is primarily confined to localized zones between the side edges 8 of adjacent plates and that the amount of such deformation varies with the distance of the viscoelastic material from the neutral axis or neutral plane of bending. Generally, this plane will lie in or very close to the base member 1. Because the viscoelastic material is concentrated in a layer spaced from surface 2, its deformation and the resulting damping effect are intensified.

In the arrangement shown in FIGS. 4–6, the plates in each row are disposed in overlapping relation to the plates in adjacent rows. When this structure is flexed transversely, plates 3 will tend to move relative to each other, as shown in exaggerated form in FIG. 6. Adjacent plates in the same row will tend to separate at their free ends remote from surface 2 and to move longitudinally and rotatably relative to overlapping plates in adjacent layers. When transverse bending occurs in the opposite direction during part of each vibration cycle, the relative motions of the plates in FIG. 6 will be in the opposite directions, with the upper edges of adjacent plates in the same layer coming closer together than the bottom edges. In each case, the relative motions of the plates in adjacent rows will develop longitudinal and rotational shearing deformation of the viscoelastic material separating those plates. Because the viscoelastic material is spaced from the surface 2, even relatively small flexural movements of that surface will result in substantial shearing deformation. The energy thereby absorbed will effectively damp flexural movements of the surface 2. Some additional damping also occurs as a result of compression and extension of the viscoelastic material between the vertical edges 8 of adjacent plates in the same row, although somewhat less than occurs with the structure of FIGS. 1–3 (where the deformation includes the viscoelastic material between the lines $a$ and $b$ in FIG. 3). In the structure shown in FIGS. 4–6, the combination of shearing, compression, and extension deformations of the viscoelastic material provides very effective damping.

In FIGS. 7–8, plates 3 are arranged with their secured edges 4 in random orientation. This type of arrangement of particularly suited for general applications, as in damping extended surfaces subject to vibrations that are not characterized by a predominantly directional orientation of bending or flexing. With the plates randomly oriented as in FIGS. 7 and 8, damping is effected by subjecting the viscoelastic layer 7 to compression, extension, and shearing deformations of the types described in connection with FIGS. 3 and 6, and various combinations of those deformations. Because these various deformations are randomly distributed throughout the viscoelastic layer, there results a substantially uniform damping of vibrations that is independent of the directional orientation of the bending and flexing involved. Such uniformity is helped by keeping the plates 3 relatively small, so that there will be a large number of randomly oriented plates secured along one edge to a given area of the surface to be damped.

In FIG. 9, plates 3 are disposed more symmetrically, in an arrangement similar to an overlapping herring-bone pattern, in which one group of plates 3a is disposed in staggered parallel rows and another group 3b is disposed in similar rows at right angles to the first group. The plates in each row overlap those in adjacent rows. This arrangement also produces damping by complex deformations of the viscoelastic layer, including compression, extension, and shearing deformations, and the plate arrangement is useful for general damping purposes.

In FIG. 10, there is shown another modification of the structure illustrated in FIG. 1, but one that is equally applicable to the other structures in which the support members or plates 3 are arranged in parallel rows. In this modification, metal strips 11 are suspended in the viscoelastic layer 7 between adjacent rows of plates. The strips are considerably longer than the plates and, if desired, may extend the whole length of the base member 1. In this arrangement, the damping effect results from a combination of compression, extension, and shearing deformations of the viscoelastic layer similar to that discussed in connection with FIGS. 4–6.

In FIG. 11 the structure is the same as that shown in FIGS. 4–6, except that additional means are provided, in the form of openings 12 in the viscoelastic material 7, for absorbing acoustical vibrations. These openings may extend, if desired, entirely through the thickness of that material to provide communication between the outside of the structure and the voids or spaces 13. The latter are bounded by the surface 2, viscoelastic layer 7, and the partitioning walls of the plates 3. Openings 12 are desirably dispersed in random fashion through the damping material and may be conveniently formed by random omission of that material from between the plates. Additional acoustical absorption can be provided by partially filling the voids 13 with conventional sound absorbing materials 14, such as a polyurethane foam or fiberglass. Acoustical absorption by the means here described does not appreciably affect the vibration damping qualities of the structure.

The principles of the present invention can also be utilized in a constrained layer type of laminate, as shown in FIG. 12. In this construction, the plates secured to the surface of base member 1 are disposed in parallel rows and are preferably, but not necessarily, aligned in both rank and file, in the manner illustrated in FIG. 1. A skin member 16 is provided with plates 17 that are similar to plates 3 and are similarly arranged and secured along an edge to member 16. The free ends of plates 17 are supported in the matrix of viscoelastic material 7, with the two sets of plates 3 and 17 disposed in overlapping relation to each other in the matrix and with base member 1 opposed to skin member 16. When the laminated structure of FIG. 12 is flexed transversely of the secured edges of the plates, the viscoelastic material between the overlapping ends of the plates will be subjected to the same type of deformation that was described in connection with the structure of FIGS. 4–6. Additionally, if desired, this form of laminate can be made acoustically absorbent by perforating one or both of the outer members 1 or 16 to permit sound waves to enter the spaces between the plates and the viscoelastic layer 7. Additional openings may be provided in the viscoelastic material itself, as described above in connection with FIG. 11. A further feature of the laminate shown in FIG. 12 is its compressibility in thickness, which confers additional damping capabilities on the structure.

In the embodiment of the invention illustrated in FIGS. 13–20, the viscoelastic damping material is applied as a coating directly to the surface to be damped and the plates are completely embedded in the damping material and supported thereby in spaced relation to that surface and to each other. The damping material and the plates are of the same types as those previously described in connection with FIGS. 1–12, and the plates in both groups of figures may be similarly oriented relative to each other and to the surface to be damped. As a result, the damping action is generally similar in both of these embodiments of the invention.

Referring to FIGS. 13–15, a coating of viscoelastic material 21 is adherently applied directly to the surface 2 of the base member 1. Completely embedded therein, and supported thereby, are a quantity of relatively small, thin, but stiff, plates 22. These plates are preferably rectangular or square and are oriented with their faces normal to the surface 2 and with their bottom edges 23 spaced from that surface by the viscoelastic damping material. The damping material may also extend, as shown in FIG. 14, beyond the upper edges 26 of the plates, but that is not a necessary limitation. The plates are shown arranged in orthogonal rows, i.e., aligned in both rank and file, similar to the arrangement shown in FIG. 1. When the base member is bent transversely of the plate orientation, i.e., about an axis normal to the plane of the paper in FIG. 14, there will be a tension stress in the upper part of the composite structure and a compression stress in the lower part, the neutral axis dividing those parts lying in or near the base member because of the relative thickness and stiffness of that member. As a result, the side edges 27 of adjacent plates in each longitudinal row will tend to move relative to each other as shown in exaggerated form in FIG. 15. The resulting deformations of the viscoelastic layer will be similar to those previously described in connection with FIG. 3 and need not be repeated here.

In FIGS. 16–18, the plates are likewise embedded in and supported by the viscoelastic damping material, but are arranged in overlapping rows similar to the arrangement shown in FIGS. 4–6. This structure, when subjected to transverse vibrations, will be damped by deformations of the viscoelastic material similar to those described in connection with FIGS. 4–6.

In FIG. 19, the plates 22 are arranged with their bottom edges in random orientation, similar to the arrangement shown in FIGS. 7–8; and damping will occur in the manner previously described in connection with those figures. Although not separately illustrated, it will be readily understood that, in this form of the invention in which the plates are embedded in and supported by the damping material, the plates can also be arranged in other patterns, such as that shown in FIG. 9, to provide damping effects similar to those described in connection with that earlier figure.

In FIG. 20, the plates are supported and arranged as in FIGS. 13 and 14; and, in addition, a stiff constraining layer 31 is affixed to the surface of the viscoelastic damping material opposite the base member 1. When this laminated structure is subjected to vibrations, the damping material will be subjected primarily to shearing stresses, because both the constraining layer 31 and base member 1 form skins that are relatively inextensible compared to the viscoelastic material between them. In other words, the skins of the laminate do not appreciably extend or contract during flexure of the laminate, so the damping material that forms the core is subjected to shear along planes normal to the skins. The plates 22 tend to localize such deformation and therefore intensify it.

Generally speaking, plates 22 in FIGS. 13–20 may be made much thinner and smaller than plates 3 in FIGS. 1–12. Plates 3 must be relatively heavy, because they are rigidly secured to the base member and must support in spaced relation thereto a layer of viscoelastic damping material. Plates 21, on the other hand, are embedded in and supported by a layer of such material applied directly to the surface of the base member and may, therefore, be on the order of several mils thick and quite small in area.

In the various forms of the invention described herein, the embedding of plates in the viscoelastic material results in substantial deformation of that material in response to even relatively small flexural movements of the surface to be damped, particularly where those flexural movements are generally transferse to the orientation of the plates. Where the plates are randomly oriented, some of the flexural movements will always be transverse to the orientation of some of the plates. On the other hand, where the plates themselves are oriented in a directional pattern, the most effective damping will be of those vibrations that have a general directional orientation transverse to that of the plate orientation. In each of these cases, the deformation of the viscoelastic material and the resulting damping is much greater than if no plates were present and the same thickness of viscoelastic material were applied directly to the surface to be damped.

According to the provision of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:
1. Damping for a base member having an extended surface subject to flexural vibrations, comprising viscoelastic damping means and a quantity of plate means embedded in the damping means, both of said means extending over a substantial portion of the surface of the base member, with one of said means being secured directly to that surface and supporting the other of said means in spaced relation to that surface, the plate means being arranged in spaced relation to each other and oriented substantially normal to said surface, and the damping means having a modulus of elasticity that is substantially less than that of the base member and of the plate means.

2. Apparatus according to claim 1, in which the plate means are in the form of thin plates having one edge rigidly secured to the surface of the base member and having end portions remote from said surface embedded in and supporting the viscoelastic damping means in spaced relation to said surface.

3. Apparatus according to claim 1, in which the viscoelastic damping means is secured to the surface of the base member.

4. Means for damping vibrations in a base member having an extended surface subject to flexural vibrations, said means comprising a quantity of plate-like support members rigidly secured to said surface along an edge of each support member, the support members being oriented substantially normal to said surface and arranged in spaced relation to each other, and a layer of viscoelastic material embedding the free end portions of the support members remote from the surface of the base member and supported by the base members in spaced relation from said surface, the viscoelastic material having a modulus of elasticity that is substantially less than that of the base member and the support members.

5. Apparatus according to claim 4, in which the support members are in the form of thin plates with their secured edges randomly oriented.

6. Apparatus according to claim 4, in which the support members are in the form of thin plates disposed in two groups, with the secured edges of the plates in one group generally oriented in spaced parallel rows and the secured edges of the plates in the other group generally oriented in similar rows disposed at an angle to the first group.

7. Means for damping a base member having an extended surface subject to flexural vibrations that are characterized, at least in part, by a given directional orientation of flexing, said means comprising a quantity of plates rigidly secured to said surface along an edge of each plate, the plates being oriented substantially normal to the surface with their secured edges extending generally transversely of said directional orientation of flexing, the plates also being arranged in spaced relation to each other in each of a plurality of substantially parallel rows, a layer of viscoelastic damping material spaced from the surface of the base member and embedding the free end portions of the plates remote from that surface, and the viscoelastic material having a modulus of elasticity that is substantially less than that of the base member and the plates.

8. Apparatus according to claim 7, in which the plates are of substantially the same size and are aligned orthogonally in both rank and file.

9. Apparatus according to claim 7, in which the plates in adjacent rows are arranged in at least partial overlapping relation to each other.

10. Apparatus according to claim 7, in which auxiliary plate-like strips are also embedded in the viscoelastic layer between rows of adjacent plates, each strip being substantially confined to said layer and extending therein parallel to said plates along a length at least equal to the distance spanned by two adjacent plates in an adjacent row.

11. Apparatus according to claim 7, in which the viscoelastic damping material is provided with openings for the absorption of acoustical vibrations.

12. Apparatus according to claim 7, that also includes a second member having an extended surface and a quantity of plates rigidly secured thereto in an arrangement similar to the arrangement of the plates on the first member, said second member being supported in spaced parallel relation to the first member and also spaced from the viscoelastic layer with the free end portions of the plates of the second member embedded in said layer and at least partially overlapping the plates of the first member.

13. Means for damping a beam-like base member having a longitudinally extending surface subject to transverse flexural vibrations, said means comprising a quantity of rectangular plates rigidly secured to that surface along an edge of each plate, the size of said plates being small relative to the size of said surface, the plates being oriented substantially normal to that surface and with their secured edges extending longitudinally thereof, the plates also being arranged in spaced relation to each other in each of a plurality of substantially parallel rows with the plates in adjacent rows substantially overlapping each other, a layer of viscoelastic damping material spaced from the surface of the base member and embedding the free end portions of the plates remote from that surface, the viscoelastic material having a modulus of elasticity that is substantially less than that of the base member and the plates, whereby the plates will subject the viscoelastic material to both longitudinal and rotational shearing as said surface vibrates.

14. Means for damping a base member having an elongated surface subject to transverse flexural vibrations, said means comprising a quantity of relatively small, stiff plates rigidly secured to said surface along an edge of each plate, the plates being oriented substantially normal to the surface with their secured edges extending generally transversely of said flexural vibrations, the plates also being arranged in spaced relation to each other in each of a plurality of substantially parallel rows, a layer of viscoelastic damping material spaced from the surface of the base member and embedding the free end portions of the plates remote from that surface, the viscoelastic material having a modulus of elasticity that is substantially less that of the base member and the plates, a second member having an elongated surface and a quantity of plates rigidly secured thereto in orientation and arrangement similar to that of the plates on the first member, said second member being disposed in opposed parallel relation to the first member and also spaced from the viscoelastic layer with the free end portions of the plates of the second member embedded in said viscoelastic layer and at least partially overlapping the adjacent free end portions of the plates of the first member.

15. Apparatus according to claim 14, in which the viscoelastic damping material and at least one of the members are provided with openings for the absorption of acoustical vibrations.

16. Apparatus according to claim 15, in which at least some of the voids bounded by the plates and the viscoelastic material and one of the members is at least partially filled with sound absorbent material.

17. A damped structure comprising a base member having a surface subject to flexural vibration, a matrix of viscoelastic damping material attached to said surface, a quantity of plates embedded in the viscoelastic material and oriented generally perpendicular to said surface, the plates being arranged in random orientation with respect to each other, each plate being separated by the viscoelastic material from said surface and from adjacent plates in the same and adjacent layers, and the modulus of elasticity of the viscoelastic material being substantially less than that of the base member and the plates.

18. Means for damping a base member having an extended surface subject to flexural vibration that are characterized, at least in part, by a given directional orientation of flexing; said means comprising a matrix of viscoelastic damping material adhered to said surface, a quantity of plates embedded in the viscoelastic material in each of a plurality of layers, the plates being oriented generally perpendicular to said surface and generally transverse of said directional orientation of flexing, each plate being separated by the viscoelastic material from said surface and from adjacent plates in the same and adjacent layers, the plates in adjacent layers being arranged in at least partial overlapping relationship to each other, and the modulus of elasticity of the viscoelastic material being substantially less than that of the base member and the plates.

19. Apparatus according to claim 18, in which the area of each plate is small relative to the area of said surface.

20. Apparatus according to claim 18, in which the plates are substantially quadrilateral in shape and substantially uniformly spaced from adjacent plates and from said surface.

21. Means for damping a base member with an elongated surface having a directional axis and the surface being subject to flexural vibrations that are characterized, at least in part, by bending or flexing of said surface transverse to said axis; said means comprising a matrix of viscoelastic damping material attached to said surface, a quantity of plates embedded in the viscoelastic material in each of a plurality of layers, the size of the plates being small compared to the size of said surface, the plates being oriented generally perpendicular to said surface and to said axis, each plate being separated by the viscoelastic material from said surface and from adjacent plates in the same and adjacent layers, the plates in adjacent layers being arranged in at least partial overlapping relationship to each other, and the modulus of elasticity of the viscoelastic material being substantially less than that of the base member and the plates.

22. A damped structure comprising a base member having a surface subject to flexural vibration, a matrix layer of viscoelastic damping material with one face of said layer attached to said surface, a quantity of plates embedded in the matrix layer in each of a plurality of rows and oriented generally perpendicular to said surface, each plate being separated by the matrix layer from said surface and from adjacent plates in the same and adjacent rows, and the modulus of elasticity of the visoelastic material being substantially less than that of the base member and the plates.

23. Apparatus according to claim 22 that also includes a skin member having an extended surface attached to the opposite face of said matrix layer in opposed parallel relation to the base member and having a modulus of elasticity greater than that of the matrix layer.

24. Means for damping a base member having an extended surface subject to flexural vibrations that are characterized, at least in part, by a given directional orientation of flexing; said means comprising a layer of viscoelastic damping material adhered to said surface, a quantity of plates embedded in the viscoelastic material in each of a plurality of rows, the plates being oriented generally perpendicular to said surface and generally transverse of said directional orientation of flexing, each plate being separated by the viscoelastic material from said surface and from adjacent plates in the same and adjacent rows, the plates being substantially of the same size and being aligned orthogonally in both rank and file, and the modulus of elasticity of the viscoelastic material being substantially less than that of the base member and the plates.

25. Apparatus according to claim 24, in which the area of each plate is small relative to the area of said surface.

References Cited by the Examiner

UNITED STATES PATENTS

| | | | |
|---|---|---|---|
| 2,960,189 | 11/1960 | Osburn | 188—1 |
| 3,078,969 | 2/1963 | Campbell et al. | 188—1 X |
| 3,088,561 | 5/1963 | Ruzicka | 188—1 |
| 3,160,233 | 12/1964 | Norman et al. | 188—1 |

DUANE A. REGER, *Primary Examiner.*